(12) United States Patent
Kuo et al.

(10) Patent No.: US 8,841,393 B2
(45) Date of Patent: *Sep. 23, 2014

(54) CATALYST COMPOSITION HAVING IMPROVED FLOW CHARACTERISTICS AND METHODS OF MAKING AND USING THE SAME

(75) Inventors: Chi-I Kuo, Humble, TX (US); Agapios Kyriacos Agapiou, Humble, TX (US); David M. Glowczwski, Baytown, TX (US); Ghanshyam Ganu H. Patel, Sugar Land, TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/988,122

(22) PCT Filed: Nov. 10, 2011

(86) PCT No.: PCT/US2011/060200
§ 371 (c)(1),
(2), (4) Date: May 17, 2013

(87) PCT Pub. No.: WO2012/074710
PCT Pub. Date: Jun. 7, 2012

(65) Prior Publication Data
US 2013/0245215 A1    Sep. 19, 2013

Related U.S. Application Data

(60) Provisional application No. 61/418,374, filed on Nov. 30, 2010.

(51) Int. Cl.
| | | |
|---|---|---|
| C08F 4/602 | (2006.01) | |
| C08F 4/642 | (2006.01) | |
| C08F 4/6592 | (2006.01) | |
| C08F 10/02 | (2006.01) | |
| C08F 4/52 | (2006.01) | |
| C08F 10/00 | (2006.01) | |
| C08F 2/00 | (2006.01) | |
| C08F 4/76 | (2006.01) | |
| C08F 4/659 | (2006.01) | |

(52) U.S. Cl.
CPC ............... *C08F 4/52* (2013.01); *C08F 4/65925* (2013.01); *C08F 2410/01* (2013.01); *C08F 4/65916* (2013.01); *C08F 2410/02* (2013.01); *C08F 10/00* (2013.01); *C08F 2/00* (2013.01); *C08F 4/76* (2013.01); *C08F 4/65927* (2013.01); *Y10S 526/943* (2013.01)
USPC ........... 526/154; 526/160; 526/165; 526/348; 526/943

(58) Field of Classification Search
CPC .......... C08F 4/602; C08F 4/642; C08F 4/646; C08F 4/6428; C08F 4/65904; C08F 4/6592; C08F 10/02
USPC .......... 526/154, 160, 165, 348, 943; 502/103, 502/132, 152, 154
See application file for complete search history.

(56) References Cited

U.S. PATENT DOCUMENTS

| | | |
|---|---|---|
| 5,283,278 A | 2/1994 | Daire et al. |
| 5,795,838 A | 8/1998 | Tsutsui et al. |
| 6,300,436 B1 | 10/2001 | Agapiou et al. |
| 6,593,267 B2 | 7/2003 | Kuo et al. |
| 6,660,815 B2 | 12/2003 | Agapiou et al. |
| 6,680,276 B2 | 1/2004 | Kuo et al. |
| 7,323,526 B2 | 1/2008 | Agapiou et al. |

FOREIGN PATENT DOCUMENTS

| | | |
|---|---|---|
| WO | WO 2009/088428 | 7/2009 |
| WO | WO 2010/039948 A2 | 4/2010 |

OTHER PUBLICATIONS

U.S. Appl. No. 61/010238, filed Jan. 7, 2008, Matthews et al.

*Primary Examiner* — Caixia Lu
(74) *Attorney, Agent, or Firm* — Jennifer A. Schmidt; Kristina Leavitt (57) ABSTRACT

Catalyst compositions for the polymerization of olefins having improved flowability properties are provided.

18 Claims, 4 Drawing Sheets

CATALYST COMPOSITION HAVING IMPROVED FLOW CHARACTERISTICS AND METHODS OF MAKING AND USING THE SAME

CROSS-REFERENCE TO RELATED APPLICATIONS

This application is a National Stage application under 35 U.S.C. §371 of International Application No. PCT/US2011/060200, filed Nov. 10, 2011, that claims the benefit of Ser. No. 61/418,374, filed Nov. 30, 2010, the disclosures of which are incorporated by reference in their entireties.

BACKGROUND

Metallocene catalysts are widely used to produce polyolefin polymers such as polyethylene polymers. They have provided efficient processes and a variety of new and improved polymers. While there are many advantages to using metallocene catalysts in olefin polymerizations, there remain significant challenges. For example, metallocene catalysts, in particular supported metallocene catalysts, may have poor flowability and the catalyst particles tend to adhere to surfaces or form agglomerates. Adding other reagents to the catalyst composition such as commonly known antifouling agents or continuity additives/aids may compound the flowability issue. This causes practical problems in storing, transporting, and then delivering the dry catalyst into a polymerization reactor. There have been some attempts to address these issues.

In order to address reactor fouling problems caused by high activity metallocene catalysts, other additives such as carboxylate metal salts are often added to the catalyst, either separately or as part of the supported catalyst composition, such as in U.S. Pat. Nos. 6,300,436 and 5,283,278. However, such additives may compound the problem of the flowability of the catalyst.

The flowability problems associated with supported metallocene catalysts have been addressed in various ways. U.S. Pat. No. 5,795,838 is directed to metallocene halides where to address the flowability issue, the patent directs using a catalyst having certain levels of alkyl groups associated with the benzene-insoluble alkylalumoxanes used to form the supported catalyst compositions, and further, by prepolymerizing the catalyst prior to using it as a dry catalyst. U.S. Pat. Nos. 6,680,276 and 6,593,267 disclose heating the catalyst composition before or while combining it with the carboxylate metal salts. U.S. Pat. No. 6,660,815 discloses the use of a composition of carboxylate metal salt with a flow improver in combination with a polymerization catalyst to improve the flowability and bulk density of the catalyst. U.S. Pat. No. 7,323,526 discloses a supported catalyst composition having improved flow properties wherein the supported catalyst composition comprises an alkylalumoxane, a metallocene-alkyl, an inorganic oxide support having an average particle size of from 0.1 to 50 μm and is calcined at a temperature greater than 600° C., and optionally contains an antifoulant agent. WO2009/088428, discloses cooling the catalyst feeding system to maintain adequate catalyst flow.

Despite these attempts to address catalyst system flowability problems, challenges remain, especially at operating temperatures above about 25° C., and particularly above about 30° C. Thus, it would be advantageous to have an improved catalyst system or composition that flows more easily at elevated temperatures and is also capable of operating in a polymerization process continuously with enhanced reactor operability.

SUMMARY

Disclosed herein are catalyst compositions for the polymerization of olefins having improved flowability properties. The catalyst composition may comprise a catalyst compound and a metal carboxylate salt. The metal carboxylate salt is preferably essentially free of carboxylic acids as determined by differential scanning calorimetry such that the metal carboxylate salt does not exhibit any melting peaks that are less than or equal to 75° C.

The metal carboxylate salt is essentially free of carboxylic acids, wherein the carboxylic acids are represented by the formula RCOOH, wherein R is a hydrocarbyl radical having from 6 to 30 carbon atoms.

Also disclosed herein are method for making the catalyst composition and polymerization processes utilizing the catalyst composition. The process of producing the catalyst composition may comprise combining the metal carboxylate salt with an organic solvent having a dielectric constant at 25° C. of greater than or equal to 3.0 to extract the free carboxylate acids; drying the extracted metal carboxylate salt; and combining the dried extracted metal carboxylate salt with the catalyst. The polymerization process may comprise contacting ethylene and optionally an alpha-olefin with the catalyst composition in a reactor under polymerization conditions to produce the ethylene polymer or copolymer.

DETAILED DESCRIPTION

Before the present compounds, components, compositions, and/or methods are disclosed and described, it is to be understood that unless otherwise indicated this invention is not limited to specific compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified. Thus, for example, reference to "a leaving group" as in a moiety "substituted with a leaving group" includes more than one leaving group, such that the moiety may be substituted with two or more such groups. Similarly, reference to "a halogen atom" as in a moiety "substituted with a halogen atom" includes more than one halogen atom, such that the moiety may be substituted with two or more halogen atoms, reference to "a substituent" includes one or more substituents, reference to "a ligand" includes one or more ligands, and the like.

As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997)(reproduced there with permission from IUPAC), unless reference is made to the Previous IUPAC form noted with Roman numerals (also appearing in the same), or unless otherwise noted.

Disclosed herein are catalyst compositions for the polymerization of olefins having improved flowability properties. The catalyst composition may comprise a metallocene catalyst compound and a metal carboxylate salt having improved flow properties. The catalyst composition may be capable of operating in a polymerization process continuously with enhanced reactor operability without the need to cool the feeding system. Also disclosed herein are methods of making the catalyst composition and polymerization processes for the production of an ethylene alpha-olefin copolymer.

It has been discovered that using a purified metal carboxylate salt in combination with a catalyst compound results in substantially improved flowability of the catalyst composition. In particular, utilizing the polymerization catalyst systems described below in combination with the carboxylate metal salt wherein the metal carboxylate salt is essentially free of carboxylic acids, wherein the carboxylic acids are represented by the formula RCOOH, wherein R is a hydrocarbyl radical having from 6 to 30 carbon atoms, results in a substantial improvement in catalyst flowability at temperatures, for example, above 25° C., and especially above about 30° C.

Metallocene Catalysts

The catalyst system may include at least one metallocene catalyst component. As used herein, "catalyst system" may refer to the catalyst, for example, metallocene catalyst as described herein, and at least one co-catalyst or sometimes called an activator, with optional components, such as supports, additives, such as, for example, continuity additives/aids, scavengers, and the like. For purposes herein, a catalyst composition refers to a combination of a catalyst compound and the inventive metal carboxylate salt which is essentially free or void of carboxylic acids and/or Group 1 salts of carboxylic acids, and/or Group 2 salts of carboxylic acids.

The metallocene catalyst or metallocene component may include "half sandwich," (i.e., at least one ligand) and "full sandwich," (i.e., at least two ligands) compounds having one or more Cp ligands (cyclopentadienyl and ligands isolobal to cyclopentadienyl) bound to at least one Group 3 to Group 12 metal atom, and one or more leaving group(s) bound to the at least one metal atom. Hereinafter, these compounds will be referred to as "metallocene(s)" or "metallocene catalyst component(s)."

In one aspect, the one or more metallocene catalyst components are represented by the formula (I):

$$Cp^A Cp^B MX_n \quad (I)$$

The metal atom "M" of the metallocene catalyst compound, as described throughout the specification and claims, may be selected from the group consisting of Groups 3 through 12 atoms and lanthanide Group atoms in one embodiment; and selected from the group consisting of Groups 4, 5 and 6 atoms in yet a more particular embodiment, and a Ti, Zr, Hf atoms in yet a more particular embodiment, and Zr in yet a more particular embodiment. The groups bound the metal atom "M" is such that the compounds described below in the formulas and structures are neutral, unless otherwise indicated.

The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

M is as described above; each X is chemically bonded to M; each Cp group is chemically bonded to M; and n is 0 or an integer from 1 to 4, and either 1 or 2 in a particular embodiment.

The ligands represented by $Cp^A$ and $Cp^B$ in formula (I) may be the same or different cyclopentadienyl ligands or ligands isolobal to cyclopentadienyl, either or both of which may contain heteroatoms and either or both of which may be substituted by a group R. In one embodiment, $Cp^A$ and $Cp^B$ are independently selected from the group consisting of cyclopentadienyl, indenyl, tetrahydroindenyl, fluorenyl, and substituted derivatives of each.

Independently, each $Cp^A$ and $Cp^B$ of formula (I) may be unsubstituted or substituted with any one or combination of substituent groups R. Non-limiting examples of substituent groups R as used in structure (I) include hydrogen radicals, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof.

More particular non-limiting examples of alkyl substituents R associated with formula (I) includes methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls such as, for example, fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins such as but not limited to olefinically unsaturated substituents including vinyl-terminated ligands, for example 3-butenyl, 2-propenyl, 5-hexenyl and the like. In one embodiment, at least two R groups, two adjacent R groups in one embodiment, are joined to form a ring structure having from 3 to 30 atoms selected from the group consisting of carbon, nitrogen, oxygen, phosphorous, silicon, germanium, aluminum, boron and combinations thereof. Also, a substituent group R group such as 1-butanyl may form a bonding association to the element M.

Each X in formula (I) is independently selected from the group consisting of: any leaving group in one embodiment; halogen ions, hydrides, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. In another embodiment, X is $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons, and substituted derivatives thereof. In some embodiments X is selected from hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls. In some embodiments X is selected from hydride, chloride, fluoride, methyl, phenyl, phenoxy, benzoxy, tosyl, fluoromethyls and fluorophenyls. In some embodiments X is selected from $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls and $C_1$ to $C_{12}$ heteroatom-containing alkylaryls in yet a more particular embodiment; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls. In some embodiments X is selected from fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls).

The metallocene catalyst compound and/or component may include those of formula (I) where $Cp^A$ and $Cp^B$ are bridged to each other by at least one bridging group, (A), such that the structure is represented by formula (II):

$$Cp^A(A)Cp^B MX_n \qquad (II)$$

These bridged compounds represented by formula (II) are known as "bridged metallocenes". $Cp^A$, $Cp^B$, M, X and n are as defined above for formula (I); and wherein each Cp ligand is chemically bonded to M, and (A) is chemically bonded to each Cp. Non-limiting examples of bridging group (A) include divalent alkyls, divalent lower alkyls, divalent substituted alkyls, divalent heteroalkyls, divalent alkenyls, divalent lower alkenyls, divalent substituted alkenyls, divalent heteroalkenyls, divalent alkynyls, divalent lower alkynyls, divalent substituted alkynyls, divalent heteroalkynyls, divalent alkoxys, divalent lower alkoxys, divalent aryloxys, divalent alkylthios, divalent lower alkyl thios, divalent arylthios, divalent aryls, divalent substituted aryls, divalent heteroaryls, divalent aralkyls, divalent aralkylenes, divalent alkaryls, divalent alkarylenes, divalent haloalkyls, divalent haloalkenyls, divalent haloalkynyls, divalent heteroalkyls, divalent heterocycles, divalent heteroaryls, divalent heteroatom-containing groups, divalent hydrocarbyls, divalent lower hydrocarbyls, divalent substituted hydrocarbyls, divalent heterohydrocarbyls, divalent silyls, divalent boryls, divalent phosphinos, divalent phosphines, divalent aminos, divalent amines, divalent ethers, divalent thioethers. Additional non-limiting examples of bridging group A include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group (A) may also contain substituent groups R as defined above for formula (I) including halogen radicals and iron. More particular non-limiting examples of bridging group (A) are represented by $C_1$ to $C_6$ alkylenes, substituted $C_1$ to $C_6$ alkylenes, oxygen, sulfur, $R'_2C=$, $R'_2Si=$, $—Si(R'_2)Si(R'_2)—$, $R'_2Ge=$, $R'P=$ (wherein "=" represents two chemical bonds), where R' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. In one embodiment, the bridged metallocene catalyst component of formula (II) has two or more bridging groups (A).

Other non-limiting examples of bridging group (A) include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom; dimethylsilyl, diethylsilyl, dimethylgermyl and diethylgermyl.

In another embodiment, bridging group (A) may also be cyclic, comprising, for example 4 to 10, 5 to 7 ring members in a more particular embodiment. The ring members may be selected from the elements mentioned above, from one or more of B, C, Si, Ge, N and O in a particular embodiment. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in particular, Si and Ge. The bonding arrangement between the ring and the Cp groups may be either cis-, trans-, or a combination.

The cyclic bridging groups (A) may be saturated or unsaturated and/or carry one or more substituents and/or be fused to one or more other ring structures. If present, the one or more substituents are selected from the group consisting of hydrocarbyl (e.g., alkyl such as methyl) and halogen (e.g., F, Cl) in one embodiment. The one or more Cp groups which the above cyclic bridging moieties may optionally be fused to may be saturated or unsaturated and are selected from the group consisting of those having 4 to 10, more particularly 5, 6 or 7 ring members (selected from the group consisting of C, N, O and S in a particular embodiment) such as, for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

The ligands $Cp^A$ and $Cp^B$ of formula (I) and (II) are different from each other in one embodiment, and the same in another embodiment.

In yet another aspect, the metallocene catalyst components include mono-ligand metallocene compounds (e.g., mono cyclopentadienyl catalyst components) such as described in WO 93/08221 for example which is incorporated herein by reference.

In yet another aspect, the at least one metallocene catalyst component is an unbridged "half sandwich" metallocene represented by the formula (IV):

$$Cp^A MQ_q X_n \qquad (IV)$$

wherein $Cp^A$ is defined as for the Cp groups in (I) and is a ligand that is bonded to M; each Q is independently bonded to M; Q is also bound to $Cp^A$ in one embodiment; X is a leaving group as described above in (I); n ranges from 0 to 3, and is 1 or 2 in one embodiment; q ranges from 0 to 3, and is 1 or 2 in one embodiment. In one embodiment, $Cp^A$ is selected from the group consisting of cyclopentadienyl, indenyl, tetrahydroindenyl, fluorenyl, substituted version thereof, and combinations thereof.

In formula (IV), Q is selected from the group consisting of $ROO^-$, $RO-$, $R(O)-$, $-NR-$, $-CR_2-$, $-S-$, $-NR_2$, $-CR_3$, $-SR$, $-SiR_3$, $-PR_2$, $-H$, and substituted and unsubstituted aryl groups, wherein R is selected from the group consisting of hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. In some embodiments, R is selected from $C_1$ to $C_6$ alkyls, $C_6$ to $C_{12}$ aryls, $C_1$ to $C_6$ alkylamines, $C_6$ to $C_{12}$ alkylarylamines, $C_1$ to $C_6$ alkoxys, and $C_6$ to $C_{12}$ aryloxys. Non-limiting examples of Q include $C_1$ to $C_{12}$ carbamates, $C_1$ to $C_{12}$ carboxylates (e.g., pivalate), $C_2$ to $C_{20}$ allyls, and $C_2$ to $C_{20}$ heteroallyl moieties.

Described another way, the "half sandwich" metallocenes above can be described as in formula (II), such as described in, for example, U.S. Pat. No. 6,069,213:

$$Cp^A M(Q_2GZ)X_n \text{ or } T(Cp^A M(Q_2GZ)X_n)_m \qquad (V)$$

wherein M, $Cp^A$, X and n are as defined above;

$Q_2GZ$ forms a polydentate ligand unit (e.g., pivalate), wherein at least one of the Q groups form a bond with M, and is defined such that each Q is independently selected from the group consisting of $-O-$, $-NR-$, $-CR_2-$ and $-S-$; G is either carbon or silicon; and Z is selected from the group consisting of R, $-OR$, $-NR_2$, $-CR_3$, $-SR$, $-SiR_3$, $-PR_2$, and hydride, providing that when Q is $-NR-$, then Z is selected from the group consisting of $-OR$, $-NR_2$, $-SR$, $-SiR_3$, $-PR_2$; and provided that neutral valency for Q is satisfied by Z; and wherein each R is independently selected from the group consisting of hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. In another embodiment, R is selected from the group consisting of $C_1$ to $C_{10}$ heteroatom containing groups, $C_1$ to $C_{10}$ alkyls, $C_6$ to $C_{12}$ aryls, $C_6$ to $C_{12}$ alkylaryls, $C_1$ to $C_{10}$ alkoxys, and $C_6$ to $C_{12}$ aryloxys;

n is 1 or 2 in a particular embodiment;

T is a bridging group selected from the group consisting of $C_1$ to $C_{10}$ alkylenes, $C_6$ to $C_{12}$ arylenes and $C_1$ to $C_{10}$ heteroatom containing groups, and $C_6$ to $C_{12}$ heterocyclic groups; wherein each T group bridges adjacent "$Cp^A M(Q_2GZ)X$" groups, and is chemically bonded to the $Cp^A$ groups;

m is an integer from 1 to 7; m is an integer from 2 to 6 in a more particular embodiment.

The metallocene catalyst component can be described more particularly in structures (VIa), (VIb), (VIc), (VId), (VIe), and (VIf):

(VIa-i)

(VIa-ii)

(VIb)

(VIc)

(VId)

(VIe)

(VIf)

wherein in structures (VIa) to (VIf), M is selected from the group consisting of Group 3 to Group 12 atoms, and selected from the group consisting of Group 3 to Group 10 atoms in a more particular embodiment, and selected from the group consisting of Group 3 to Group 6 atoms in yet a more particular embodiment, and selected from the group consisting of Group 4 atoms in yet a more particular embodiment, and selected from the group consisting of Zr and Hf in yet a more particular embodiment; and is Zr in yet a more particular embodiment; wherein Q in (VIa) to (VIf) is selected from the group consisting of hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, alkylenes, aryls, arylenes, alkoxys, aryloxys, amines, arylamines (e.g., pyridyl) alkylamines, phosphines, alkylphosphines, substituted alkyls, substituted aryls, substituted alkoxys, substituted aryloxys, substituted amines, substituted alkylamines, substituted phosphines, substituted alkylphosphines, carbamates, heteroallyls, carboxylates (non-limiting examples of suitable carbamates and carboxylates include trimethylacetate, trimethylacetate, methylacetate, p-toluate, benzoate, diethylcarbamate, and dimethylcarbamate), fluorinated alkyls, fluorinated aryls, and fluorinated alkylcarboxylates; wherein the saturated groups defining Q comprise from 1 to 20 carbon atoms in one embodiment; and wherein the aromatic groups comprise from 5 to 20 carbon atoms in one embodiment; wherein R* may be selected from divalent alkyls, divalent lower alkyls, divalent substituted alkyls, divalent heteroalkyls, divalent alkenyls, divalent lower alkenyls, divalent substituted alkenyls, divalent heteroalkenyls, divalent alkynyls, divalent lower alkynyls, divalent substituted alkynyls, divalent heteroalkynyls, divalent alkoxys, divalent lower alkoxys, divalent aryloxys, divalent alkylthios, divalent lower alkyl thios, divalent arylthios, divalent aryls, divalent substituted aryls, divalent heteroaryls, divalent aralkyls, divalent aralkylenes, divalent alkaryls, divalent alkarylenes, divalent haloalkyls, divalent haloalkenyls, divalent haloalkynyls, divalent heteroalkyls, divalent heterocycles, divalent heteroaryls, divalent heteroatom-containing groups, divalent hydrocarbyls, divalent lower hydrocarbyls, divalent substituted hydrocarbyls, divalent heterohydrocarbyls, divalent silyls, divalent boryls, divalent phosphinos, divalent phosphines, divalent aminos, divalent amines, divalent ethers, divalent thioethers. Additionally, R* may be from the group of divalent hydrocarbylenes and heteroatom-containing hydrocarbylenes in one embodiment; and selected from the group consisting of alkylenes, substituted alkylenes and heteroatom-containing hydrocarbylenes in another embodiment; and selected from the group consisting of $C_1$ to $C_{12}$ alkylenes, $C_1$ to $C_{12}$ substituted alkylenes, and $C_1$ to $C_{12}$ heteroatom-containing hydrocarbylenes in a more particular embodiment; and selected from the group consisting of $C_1$ to $C_4$ alkylenes in yet a more particular embodiment; and wherein both R* groups are identical in another embodiment in structures (VIf);

A is as described above for (A) in structure (II), and more particularly, selected from the group consisting of a chemical bond, —O—, —S—, —$SO_2$—, —NR—, =$SiR_2$, =$GeR_2$, =SnR$_2$, —R$_2$SiSiR$_2$—, RP=, C$_1$ to C$_{12}$ alkylenes, substituted C$_1$ to C$_{12}$ alkylenes, divalent C$_4$ to C$_{12}$ cyclic hydrocarbons and substituted and unsubstituted aryl groups in one embodiment; and selected from the group consisting of C$_5$ to C$_8$ cyclic hydrocarbons, —CH$_2$CH$_2$—, =CR$_2$ and =SiR$_2$ in a more particular embodiment; wherein and R is selected from the group consisting of alkyls, cycloalkyls, aryls, alkoxys, fluoroalkyls and heteroatom-containing hydrocarbons in one embodiment; and R is selected from the group consisting of C$_1$ to C$_6$ alkyls, substituted phenyls, phenyl, and C$_1$ to C$_6$ alkoxys in a more particular embodiment; and R is selected from the group consisting of methoxy, methyl, phenoxy, and phenyl in yet a more particular embodiment;

wherein A may be absent in yet another embodiment, in which case each R* is defined as for R$^1$-R$^{13}$; each X is as described above in (I); n is an integer from 0 to 4, and from 1 to 3 in another embodiment, and 1 or 2 in yet another embodiment; and R$^1$ through R$^{13}$ are independently: selected from the group consisting of hydrogen radicals, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos through R$^{13}$ may also be selected independently from C$_1$ to C$_{12}$ alkyls, C$_2$ to C$_{12}$ alkenyls, C$_6$ to C$_{12}$ aryls, C$_7$ to C$_{20}$ alkylaryls, C$_1$ to C$_{12}$ alkoxys, C$_1$ to C$_{12}$ fluoroalkyls, C$_6$ to C$_{12}$ fluoroaryls, and C$_1$ to C$_{12}$ heteroatom-containing hydrocarbons and substituted derivatives thereof in one embodiment; selected from the group consisting of hydrogen radical, fluorine radical, chlorine radical, bromine radical, C$_1$ to C$_6$ alkyls, C$_2$ to C$_6$ alkenyls, C$_7$ to C$_{18}$ alkylaryls, C$_1$ to C$_6$ fluoroalkyls, C$_2$ to C$_6$ fluoroalkenyls, C$_7$ to C$_{18}$ fluoroalkylaryls in a more particular embodiment; and hydrogen radical, fluorine radical, chlorine radical, methyl, ethyl, propyl, isopropyl, butyl, isobutyl, tertiary butyl, hexyl, phenyl, 2,6-dimethylpheyl, and 4-tertiarybutylpheyl groups in yet a more particular embodiment; wherein adjacent R groups may form a ring, either saturated, partially saturated, or completely saturated.

The structure of the metallocene catalyst component represented by (VIa) may take on many forms such as disclosed in, for example, U.S. Pat. No. 5,026,798, U.S. Pat. No. 5,703,187, and U.S. Pat. No. 5,747,406, including a dimmer or oligomeric structure, such as disclosed in, for example, U.S. Pat. No. 5,026,798 and U.S. Pat. No. 6,069,213.

In a particular embodiment of the metallocene represented in (VId), R$^1$ and R$^2$ form a conjugated 6-membered carbon ring system that may or may not be substituted.

It is contemplated that the metallocene catalysts components described above include their structural or optical or enantiomeric isomers (racemic mixture), or may be a pure enantiomer in some embodiments.

As used herein, a single, bridged, asymmetrically substituted metallocene catalyst component having a racemic and/ or meso isomer does not, itself, constitute at least two different bridged, metallocene catalyst components.

The "metallocene catalyst compound", also referred to herein as the metallocene catalyst component" may comprise any combination of any "embodiment" described herein.

Metallocene compounds and catalysts are known in the art and any one or more may be utilized herein. Suitable metallocenes include but are not limited to all of the metallocenes disclosed and referenced in the U.S. patents cited above, as well as those disclosed and referenced in U.S. Pat. Nos. 7,179,876, 7,169,864, 7,157,531, 7,129,302, 6,995,109, 6,958,306, 6,884748, 6,689,847, U.S. Patent Application publication number 2007/0055028, and published PCT Application Nos. WO 97/22635, WO 00/699/22, WO 01/30860, WO 01/30861, WO 02/46246, WO 02/50088, WO 04/026921, and WO 06/019494, all fully incorporated herein by reference. Additional catalysts suitable for use herein include those referenced in U.S. Pat. Nos. 6,309,997, 6,265, 338, U.S. Patent Application publication number 2006/ 019925, and the following articles: Chem Rev 2000, 100, 1253, Resconi; Chem Rev 2003, 103, 283; Chem. Eur. J. 2006, 12, 7546 Mitsui; J Mol Catal A 2004, 213, 141; Macromol Chem Phys, 2005, 206, 1847; and J Am Chem Soc 2001, 123, 6847.

Conventional Catalysts and Mixed Catalysts

The catalyst composition may include one or metallocene catalysts as described above and/or other conventional polyolefin catalysts, as well as Group 15 atom containing catalysts described below.

"Group 15 atom containing" catalysts or "Group 15-containing" catalysts may include complexes of Group 3 to 12 metal atoms, wherein the metal atom is 2 to 8 coordinate, the coordinating moiety or moieties including at least two Group 15 atoms, and up to four Group 15 atoms. In one embodiment, the Group 15-containing catalyst component is a complex of a Group 4 metal and from one to four ligands such that the Group 4 metal is at least 2 coordinate, the coordinating moiety or moieties including at least two nitrogens. Representative Group 15-containing compounds are disclosed in, for example, WO 99/01460, EP A1 0 893 454, U.S. Pat. Nos. 5,318,935, 5,889,128, 6,333,389 B2 and 6,271,325 B1.

In an embodiment, the Group 15-containing catalyst components may include Group 4 imino-phenol complexes, Group 4 bis(amide) complexes, and Group 4 pyridyl-amide complexes that are active towards olefin polymerization to any extent. In one possible embodiment, the Group 15-containing catalyst component may include a bisamide compound such as [(2,3,4,5,6 Me5C6)NCH2CH2]2NHZrBz2 (from Boulder Chemical).

Activators and Activation Methods for Catalyst Compounds

Embodiments of the catalyst composition may further comprise an activator. An activator is defined in a broad sense as any combination of reagents that increases the rate at which a transition metal compound oligomerizes or polymerizes unsaturated monomers, such as olefins. The catalyst compounds may be activated for oligomerization and/or polymerization catalysis in any manner sufficient to allow coordination or cationic oligomerization and/or polymerization.

In some embodiments, the activator is a Lewis-base, such as for example, diethyl ether, dimethyl ether, ethanol, or methanol. Other activators that may be used include those described in WO 98/07515 such as tris(2,2',2"-nonafluorobiphenyl) fluoroaluminate.

Combinations of activators may be used. For example, alumoxanes and ionizing activators may be used in combinations, see for example, EP-B1 0 573 120, WO 94/07928 and WO 95/14044 and U.S. Pat. Nos. 5,153,157 and 5,453,410. WO 98/09996 describes activating metallocene catalyst compounds with perchlorates, periodates and iodates including their hydrates. WO 98/30602 and WO 98/30603 describe the use of lithium (2,2'-bisphenyl-ditrimethylsilicate). 4THF as an activator for a metallocene catalyst compound. WO 99/18135 describes the use of organo-boron-aluminum activators. EP-B1-0 781 299 describes using a silylium salt in combination with a non-coordinating compatible anion. WO 2007/024773 suggests the use of activator-supports which may comprise a chemically-treated solid oxide, clay mineral, silicate mineral, or any combination thereof. Also, methods of activation such as using radiation (see EP-B1-0 615 981), electro-chemical oxidation, and the like are also contemplated as activating methods for the purposes of rendering the neutral metallocene catalyst compound or precursor to a metallocene cation capable of polymerizing olefins. Other activators or methods for activating a metallocene catalyst compound are described in, for example, U.S. Pat. Nos. 5,849,852, 5,859,653 and 5,869,723 and PCT WO 98/32775.

In some embodiments, alumoxanes may be utilized as an activator in the catalyst composition. Alumoxanes are generally oligomeric compounds containing —Al(R)—O— subunits, where R is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide. Mixtures of different alumoxanes and modified alumoxanes may also be used. For further descriptions, see U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and EP 0 561 476 A1, EP 0 279 586 B1, EP 0 516 476 A, EP 0 594 218 A 1 and WO 94/10180.

Alumoxanes may be produced by the hydrolysis of the respective trialkylaluminum compound. MMAO may be produced by the hydrolysis of trimethylaluminum and a higher trialkylaluminum such as triisobutylaluminum. MMAO's are generally more soluble in aliphatic solvents and more stable during storage. There are a variety of methods for preparing alumoxane and modified alumoxanes, non-limiting examples of which are described in, for example, U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, WO 94/10180 and WO 99/15534. In an embodiment, a visually clear methylalumoxane may be used. A cloudy or gelled alumoxane can be filtered to produce a clear solution or clear alumoxane can be decanted from the cloudy solution. Another alumoxane is a modified methyl alumoxane (MMAO) cocatalyst type 3A (commercially available from Akzo Chemicals, Inc. under the trade name Modified Methylalumoxane type 3A, disclosed in U.S. Pat. No. 5,041,584).

In some embodiments, an ionizing or stoichiometric activator, neutral or ionic, such as tri (n-butyl) ammonium tetrakis (pentafluorophenyl) boron, a trisperfluorophenyl boron metalloid precursor or a trisperfluoronaphtyl boron metalloid precursor, polyhalogenated heteroborane anions (see, for example, WO 98/43983), boric acid (see, for example, U.S. Pat. No. 5,942,459) or combinations thereof, may be used. The neutral or ionic activators may be used alone or in combination with alumoxane or modified alumoxane activators.

Examples of neutral stoichiometric activators may include tri-substituted boron, tellurium, aluminum, gallium and indium or mixtures thereof. The three substituent groups may be each independently selected from the group of alkyls, alkenyls, halogen, substituted alkyls, aryls, arylhalides, alkoxy and halides. In embodiments, the three substituent groups may be independently selected from the group of halogen, mono or multicyclic (including halosubstituted) aryls, alkyls, and alkenyl compounds and mixtures thereof; in a class of embodiments are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). Alternatively, the three groups are alkyls having 1 to 4 carbon groups, phenyl, napthyl or mixtures thereof. In other embodiments, the three groups are halogenated, in an embodiment fluorinated, aryl groups. In yet other illustrative embodiments, the neutral stoichiometric activator is trisperfluorophenyl boron or trisperfluoronapthyl boron.

Ionic stoichiometric activator compounds may contain an active proton, or some other cation associated with, but not coordinated to, or only loosely coordinated to, the remaining ion of the ionizing compound. Such compounds and the like are described in, for example, European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124.

Supports

The above described catalyst compounds may be combined with one or more supports using one of the support methods well known in the art or as described below. For example, in the catalyst compound may be used in a supported form, such as, deposited on, contacted with, or incorporated within, adsorbed or absorbed in, or on the support.

As used herein, the term "support" refers to compounds comprising Group 2, 3, 4, 5, 13 and 14 oxides and chlorides. Suitable supports include, for example, silica, magnesia, titania, zirconia, montmorillonite, phyllosilicate, alumina, silica-alumina, silica-chromium, silica-titania, magnesium chloride, graphite, magnesia, titania, zirconia, montmorillonite, phyllosilicate, and the like.

The support may possess an average particle size in the range of from about 0.1 to about 50 µm, or from about 1 to about 40 µm, or from about 5 to about 40 µm.

The support may have an average pore size in the range of from about 10 to about 1000 Å, or about 50 to about 500 Å, or 75 to about 350 Å. In some embodiments, the average pore size of the support is from about 1 to about 50 µm.

The support may have an average pore size in the range of from about 10 to about 1000 Å, or about 50 to about 500 Å, or 75 to about 350 Å. In some embodiments, the average pore size of the support is from about 1 to about 50 µm.

The support may have a surface area in the range of from about 10 to about 700 $m^2/g$, or from about 50 to about 500 $m^2/g$, or from about 100 to about 400 $m^2/g$.

The support may have a pore volume in the range of from about 0.1 to about 4.0 cc/g, or from about 0.5 to about 3.5 cc/g, or from about 0.8 to about 3.0 cc/g.

The support, such as an inorganic oxide, may have a surface area in the range of from about 10 to about 700 m2/g, a pore volume in the range of from about 0.1 to about 4.0 cc/g, and an average particle size in the range of from about 1 to about 500 µm. Alternatively, the support may have a surface area in the range of from about 50 to about 500 m2/g, a pore volume of from about 0.5 to about 3.5 cc/g, and an average particle size of from about 10 to about 200 µm. In some embodiments, the surface area of the support is in the range is from about 100 to about 400 m2/g and the support has a pore volume of from about 0.8 to about 3.0 cc/g and an average particle size of from about 5 to about 100 µm.

The catalyst compounds may be supported on the same or separate supports together with an activator, or the activator may be used in an unsupported form, or may be deposited on a support different from the supported catalyst compound.

There are various other methods in the art for supporting a polymerization catalyst compound. For example, the catalyst compound may contain a polymer bound ligand as described in, for example, U.S. Pat. Nos. 5,473,202 and 5,770,755; the catalyst may be spray dried as described in, for example, U.S. Pat. No. 5,648,310; the support used with the catalyst may be functionalized as described in European publication EP-A-0 802 203, or at least one substituent or leaving group is selected as described in U.S. Pat. No. 5,688,880.

Metal Carboxylate Salt

As used herein, the term "metal carboxylate salt" is any mono- or di- or tri-carboxylic acid salt with a metal portion from the Periodic Table of Elements. Non-limiting examples include saturated, unsaturated, aliphatic, aromatic or saturated cyclic carboxylic acid salts. Examples of the carboxylate ligand include, but are not limited to, acetate, propionate, butyrate, valerate, pivalate, caproate, isobuytlacetate, t-butylacetate, caprylate, heptanate, pelargonate, undecanoate, oleate, octoate, palmitate, myristate, margarate, stearate, arachate and tercosanoate. Non-limiting examples of the metal portion includes a metal from the Periodic Table of Elements selected from the group of Al, Mg, Ca, Sr, Sn, Ti, V, Ba, Zn, Cd, Hg, Mn, Fe, Co, Ni, Pd, Li and Na.

Preferred metal carboxylate salts for use herein are essentially free of carboxylic acids, wherein the carboxylic acids are represented by the formula RCOOH, wherein R is a hydrocarbyl radical having from 6 to 30 carbon atoms. The metal carboxylate salt may have less than or equal to about 1 wt % of total free carboxylic acid based on the total weight of the metal carboxylate salt as determined chromatographically, or less than or equal to about 0.5 wt %, or less than or equal to about 0.1 wt % of total free carboxylic acid based on the total weight of the metal carboxylate salt.

The metal carboxylate salts according may be essentially free of carboxylic acids, Group 1 salts of carboxylic acids, and/or Group 2 salts of carboxylic acids. For purposes herein, carboxylic acids are represented by the formula $A(OCR)_z$, wherein A is hydrogen, a Group 1 metal, a Group 2 metal, or a combination thereof, wherein R is a hydrocarbyl radical having from 6 to 30 carbon atoms, and wherein z is 1 or 2 and is equal to the valance of A. The metal carboxylate salt may have less than or equal to about 1 wt % of total free carboxylic acid, Group 1 salts of carboxylic acids, and/or Group 2 salts of carboxylic acids based on the total weight of the metal carboxylate salt as determined chromatographically, or less than or equal to about 0.5 wt %, or less than or equal to about 0.1 wt % of total free carboxylic acid, Group 1 salts of carboxylic acids, and/or Group 2 salts of carboxylic acids based on the total weight of the extracted metal carboxylate salt.

Figure 1:
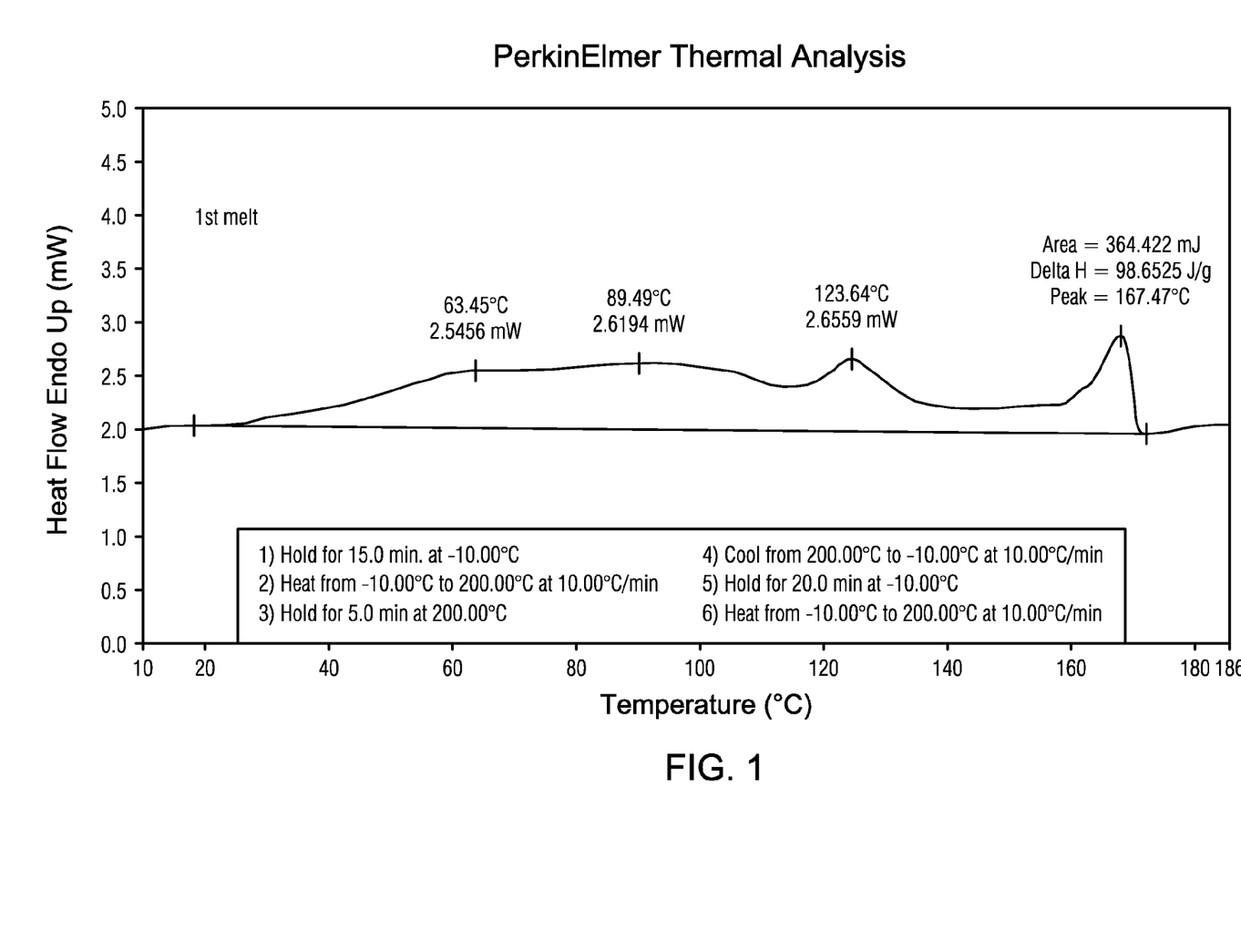
FIG. 1 presents differential scanning calorimetry results for a comparative aluminum stearate.

The metal carboxylate salts suitable for use herein are essentially free of carboxylic acids as determined by differential scanning calorimetry (DSC). In such a determination, melting points associated with free acids and/or Group 1 salts of carboxylic acids, and/or Group 2 salts of carboxylic acids are not present in the DSC thermal analysis. Turning now to FIG. 1, the DSC analysis of a conventional aluminum stearate is shown. Conventional aluminum stearate is a combination of tri-aluminum stearate Al(St)3 having a melting point of ~110-115° C., di-aluminum stearate Al(St)2(OH), having a melting point of ~145-150°, mono-aluminum stearate Al(St)(OH)2, having a melting point of ~165-170°, and between about 2 and 5 wt % of free acids including stearic acid having a melting point of ~70° C., plamitic acid having a melting point of ~63° C., and lauric acid having a melting point of ~44° C. As indicated in FIG. 1, a melting point is observed at 63.45° C., which corresponds to the appropriate melting point of plamitic acid.

Figure 2:
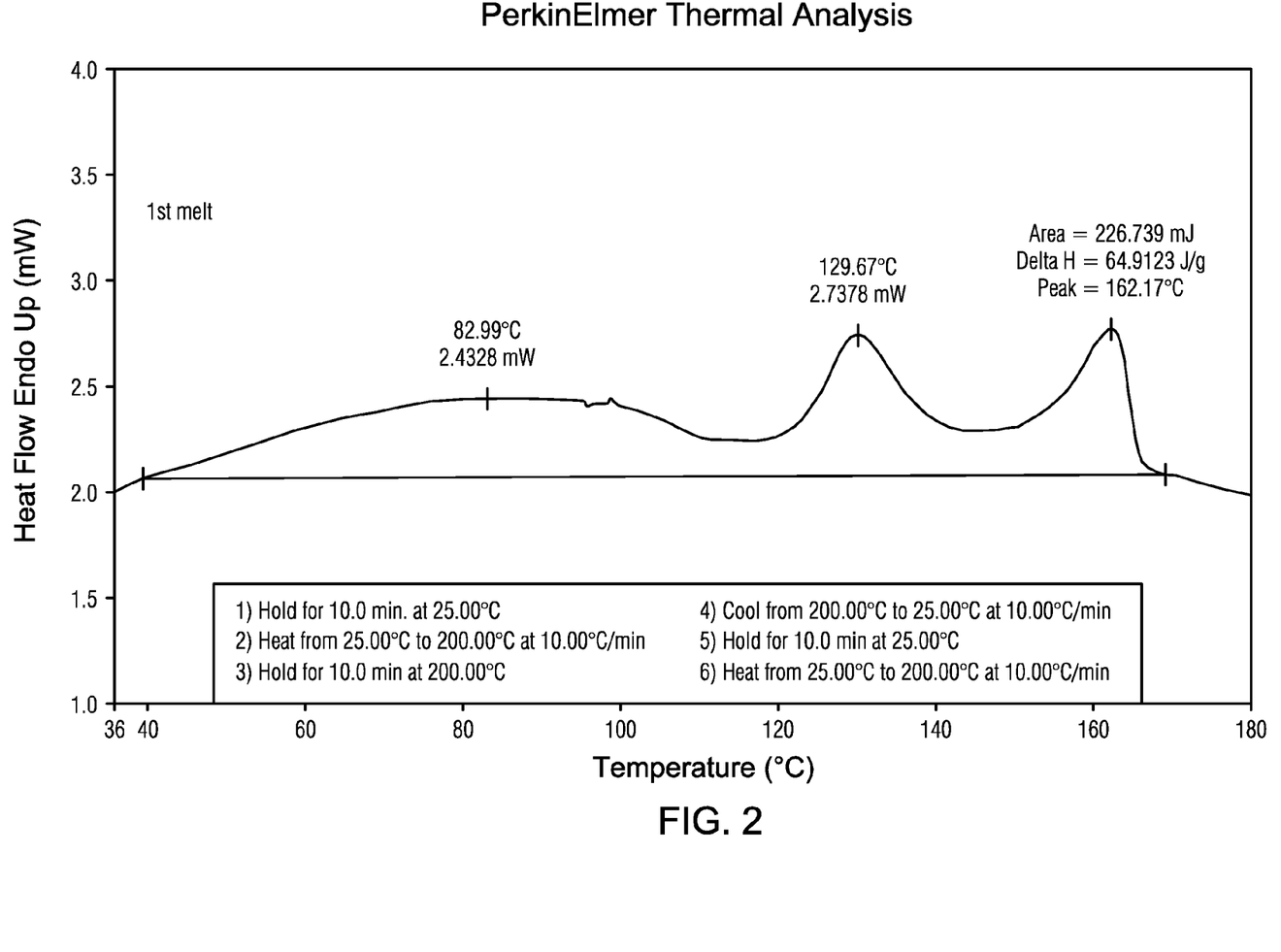
FIG. 2 presents the first melt differential scanning calorimetry results for aluminum stearate extracted with methanol to remove carboxylic acids.
Figure 3:
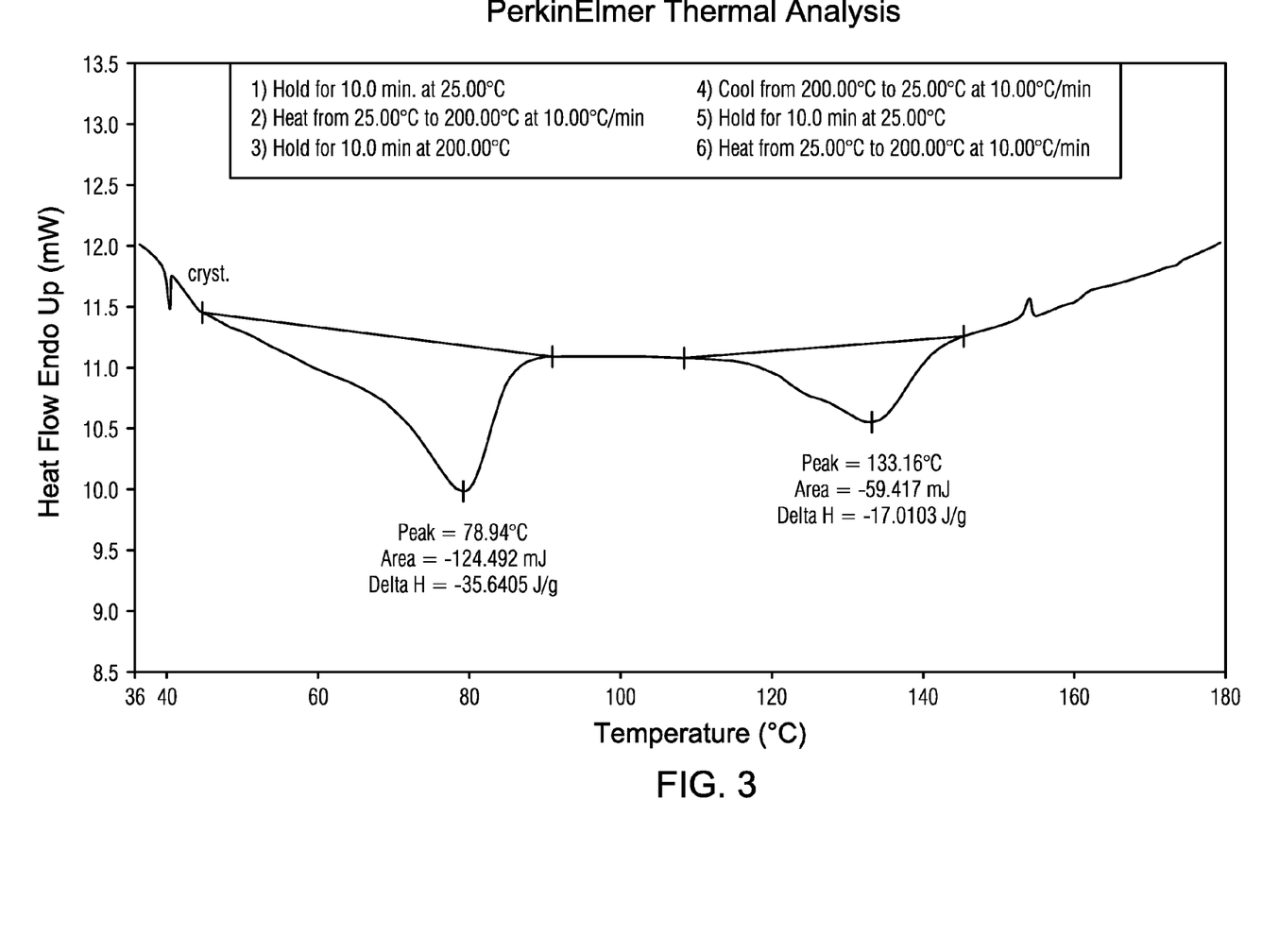
FIG. 3 presents the first crystallization differential scanning calorimetry results for aluminum stearate extracted with methanol to remove carboxylic acids.
Figure 4:
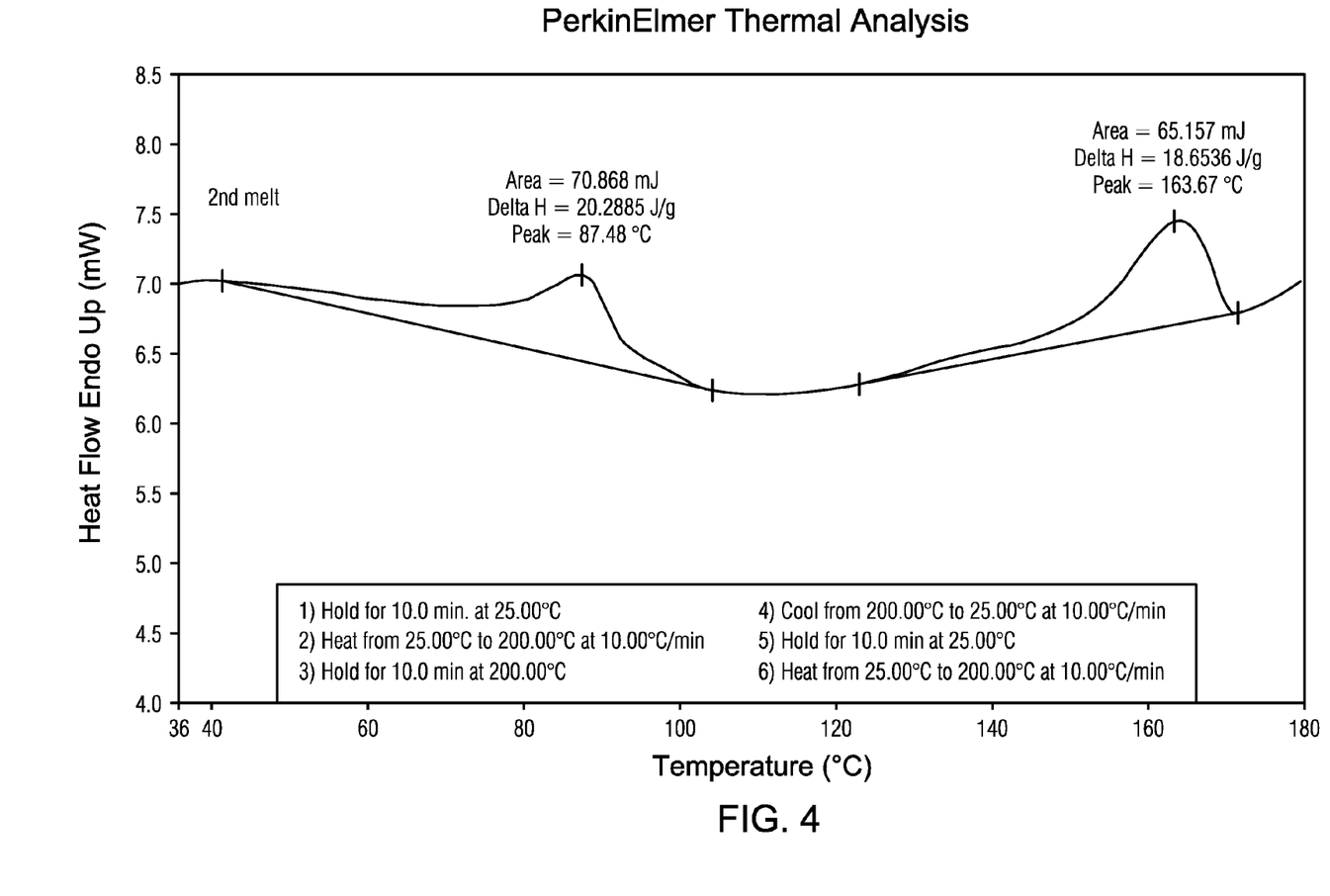
FIG. 4 presents the second melt differential scanning calorimetry results for aluminum stearate extracted with methanol.

As shown in FIG. 2, an aluminum distearate that has been extracted with a polar organic solvent has a DSC trace which is essentially free from free acids, and/or Group 1 salts of free acids, and/or Group 2 salts of free acids. Importantly, the peaks found in FIG. 2 at 82.99° C. and at 129.67° C. do not represent melting points of free carboxylic acid, Group 1 salts of carboxylic acids, and/or Group 2 salts of carboxylic acids. Instead, these peaks represent other phase changes. This is observed in FIG. 3, which shows the DSC trace for the same sample shown in FIG. 2 during the cooling down of the sample. The peaks are "negative peaks" at 78.94° C. and 133.16° C., which correspond to the phase transitions previously observed at 82.99° C. and at 129.67° C. Turning now to FIG. 4, these same two phase transitions are again seen at 87.48° C. and 163.67° C. during the second melt cycle of this same sample proving that these peaks represent other phase transitions. Importantly, no melting point is observed for any free carboxylic acid, Group 1 salts of carboxylic acids, and/or Group 2 salts of carboxylic acids in these preferred metal carboxylate salts.

Preferred metal carboxylate salts suitable for use herein are essentially free of carboxylic acids as determined by differential scanning calorimetry (DSC). As such they do not exhibit melting points associated with free acids and/or Group 1 salts of carboxylic acids, and/or Group 2 salts of carboxylic acids in the DSC thermal analysis. Therefore, the DSC thermal analysis of the metal carboxylate salt does not exhibit any melting points that are less than or equal to 75° C., or less than or equal to 73° C., or less than or equal to 70° C., or less than or equal to 65° C.

Preferred metal carboxylate salts have DSC melting points that are greater than or equal to 75° C., or greater than or equal to 80° C., or greater than or equal to 85° C., or are greater than or equal to 90° C., or are greater than or equal to 95° C., or are greater than or equal to 100° C., or are greater than or equal to 105° C.

DSC measurements can be made on a Perkin Elmer System 7 Thermal Analysis System according to ASTM D 3418. For example, the data reported are $T_{max}$ from first melting data ($T_{max}$ first melt) and $T_{max}$ from second melting data ($T_{max}$ second melt), respectively. To obtain the $T_{max}$ first melt, a sample of reactor granules is heated at a programmed rate of 10° C./min to a temperature above its melting range. Specifically, the samples were 1) held for 10 min at −20° C., 2) heated from −20° C. to 200° C. at 10° C./min 3) held for 10 min at 200° C. To obtain the $T_{max}$ second melt, the sample is heated at a programmed rate of 10° C./min to a temperature above its melting range as described above, cooled at a programmed rate of 10° C./min to a temperature below its crystallization range (−20° C.), held at this low temperature for 10 min and reheated to 200° C. at a programmed rate of 10° C./min, where the data reported is from the first melt.

The carboxylate metal salt is represented by the following general formula:

where M is a metal from Group 3 to 16 and the Lanthanide and Actinide series, preferably from Groups 8 to 13, more preferably from Group 13 with aluminum being most preferred; Q is halogen, hydrogen, a hydroxy or hydroxide, alkyl, alkoxy, aryloxy, siloxy, silane or sulfonate group R is a hydrocarbyl radical having from 1 to 100 carbon atoms; and x is an integer from 0 to 3 and y is an integer from 1 to 4 and the sum of x and y is equal to the valence of the metal.

R in the above formula may be the same or different. Non-limiting examples of R include hydrocarbyl radicals having 2 to 100 carbon atoms that include alkyl, aryl, aromatic, aliphatic, cyclic, saturated or unsaturated hydrocarbyl radicals. In an embodiment of the invention, R is a hydrocarbyl radical having greater than or equal to 8 carbon atoms, preferably greater than or equal to 12 carbon atoms and more preferably greater than 14 carbon atoms. In another embodiment R comprises a hydrocarbyl radical having from 17 to 90 carbon atoms, preferably 17 to 72, and most preferably from 17 to 54 carbon atoms. In an embodiment, R comprises 6 to 30 carbon atoms, with 8 to 24 carbon atoms being more preferred, and with 16 to 18 carbon atoms (e.g., plamityl and stearyl) being most preferred.

Non-limiting examples of Q in the above formula include one or more, same or different, hydrocarbon containing group such as alkyl, cycloalkyl, aryl, alkenyl, arylalkyl, arylalkenyl or alkylaryl, alkylsilane, arylsilane, alkylamine, arylamine, alkyl phosphide, alkoxy having from 1 to 30 carbon atoms. The hydrocarbon containing group may be linear, branched, or even substituted. Also, Q in one embodiment is an inorganic group such as a halide, sulfate or phosphate.

The carboxylate metal salts may comprise aluminum carboxylates such as aluminum mono, di- and tri-stearates, aluminum octoates, oleates and cyclohexylbutyrates. In yet a more preferred embodiment, the carboxylate metal salt comprises $[CH_3(CH_2)_{16}COO]_3Al$, an aluminum tri-stearate, $[CH_3(CH_2)_{16}COO]_2$—Al—OH, an aluminum di-stearate, and an $CH_3(CH_2)_{16}COO$—Al(OH)$_2$, an aluminum mono-stearate.

In an preferred embodiment, the carboxylate metal salts are essentially free of carboxylic acids, and/or Group 1 salts of carboxylic acids, and/or Group 2 salts of carboxylic acids, wherein the carboxylic acids are represented by the formula $A(OCR)_z$, wherein A is hydrogen, a Group 1 metal, a Group 2 metal, or a combination thereof, wherein R is a hydrocarbyl radical having from 6 to 30 carbon atoms, and wherein z is 1 or 2 and is equal to the valance of A. Other examples of carboxylate metal salts include titanium stearates, tin stearates, calcium stearates, zinc stearates, boron stearate and strontium stearates.

The carboxylate metal salt may be combined with antistatic agents such as fatty amines, for example, KEMAMINE AS 990/2 zinc additive, a blend of ethoxylated stearyl amine and zinc stearate, or KEMAMINE AS 990/3, a blend of ethoxylated stearyl amine, zinc stearate and octadecyl-3,5-di-tert-butyl-4-hydroxyhydrocinnamate. Both these blends are available from Chemtura Corporation, Memphis, Tenn.

Commercially available carboxylate metal salts frequently contain free carboxylic acids or a derivative thereof, usually residually remaining after synthesis of the carboxylate metal salt. Without being bound to theory, it is believed that flowability problems of the metal carboxylate salt at ambient temperatures and above about 25° C. are due, at least in part, to the fraction of free carboxylic acid or Group 1 or Group 2 salts thereof present in the carboxylate metal salt.

Herein preferred catalyst compositions include a metal carboxylate salt or a metal carboxylate salt and a continuity additive having no free carboxylic acids or being essentially free (also referred to as "substantially free") of free carboxylic acids. "Substantially free" refers to a metal carboxylate salt which does not show a melting point which corresponds to the acid or a Group 1 or Group 2 salt thereof in the DSC analysis thereof.

In another embodiment, a metal carboxylate salt which is essentially free of carboxylic acid has less than or equal to about 1 wt % of total carboxylic acid based on the total weight of the metal carboxylate salt as determined chromatographically, preferably less than or equal to about 0.5 wt %, more preferably less than or equal to about 0.1 wt % of total carboxylic acid based on the total weight of the metal carboxylate salt.

In an embodiment, the metal carboxylate salt which is essentially free of free acid is produced by extracting a metal carboxylate salt with an organic solvent having a dielectric constant at 25° C. of greater than 3.0. This polar solvent results in an improved extraction of the polar compounds including the free acids present in the crude metal carboxylate salt. In an embodiment, the metal carboxylate salt combined with the catalyst compound has been previously extracted with an organic solvent to remove carboxylic acids, Group 1 salts of carboxylic acids, and/or Group 2 salts of carboxylic acids, wherein the organic solvent is selected from the group consisting of $C_1$-$C_{10}$ alcohols, $C_1$-$C_{10}$ ketones, $C_1$-$C_{10}$ esters, $C_1$-$C_{10}$ ethers, $C_1$-$C_{10}$ alkyl halides, $C_1$-$C_{10}$ alkylonitriles, $C_1$-$C_{10}$ dialkyl sulfoxides, and combinations thereof. In another embodiment, the organic solvent is selected from the group consisting of methanol, ethanol, propanol, isopropanol, butanol, acetone, methyl-ethyl ketone, methyl acetate, ethyl acetate, methyl propionate, methyl buterate, dimethyl ether, diethyl ether, 1,4-dioxane, tetrahydrofuran, chloroform, dichloromethane, acetonitrile, dimethyl sulfoxide, and combinations thereof.

The dielectric constant of a solvent is defined by e in the equation:

$$F=(QQ')/(\in r^2)$$

where F is the force of attraction between two charges Q and Q' separated by a distance r in the solvent. The dielectric constants of many solvents are well known and can be found, for example, in the CRC Handbook of Chemistry and Physics 59$^{th}$ Edition on pages E-55 to E-62.

Preferred solvents have a dielectric constant at 25° C. of greater than or equal to 3, or greater than or equal to 5, or greater than or equal to 7, or greater than or equal to 10, or greater than or equal to 12, or greater than or equal to 15, or greater than or equal to 17. In some embodiments, the solvent may have a dielectric constant at 25° C. of at least 20.

Additional Continuity Additives/Aids

In addition to the metal carboxylate salts described above, it may also be desirable to use one or more additional continuity additives to, for example, aid in regulating static levels in the reactors. As used herein, the term "continuity additive or aid" and "antifoulant agent" refer to compounds or mixtures of compounds, such as solids or liquids, that are useful in gas phase or slurry phase polymerization processes to reduce or eliminate fouling of the reactor, where "fouling" may be manifested by any number of phenomena including sheeting of the reactor walls, plugging of inlet and outlet lines, formation of large agglomerates, or other forms of reactor upsets known in the art. For purposes herein, the terms may be used interchangeably. The continuity additive may be used as a part of the catalyst composition or introduced directly into the reactor independently of the catalyst composition. In some embodiments, the continuity additive is supported on the inorganic oxide of the supported catalyst composition described herein.

Non-limiting examples of continuity additives include fatty acid amines, amide-hydrocarbon or ethyoxylated-amide compounds such as described as "surface modifiers" in WO 96/11961; carboxylate compounds such as aryl-carboxylates and long chain hydrocarbon carboxylates, and fatty acid-metal complexes; alcohols, ethers, sulfate compounds, metal oxides and other compounds known in the art. Some specific examples of continuity additives include 1,2-diether organic compounds, magnesium oxide, ARMOSTAT 310, ATMER 163, ATMER AS-990, and other glycerol esters, ethoxylated amines (e.g., N,N-bis(2-hydroxyethyl)octadecylamine), alkyl sulfonates, and alkoxylated fatty acid esters; STADIS 450 and 425, KEROSTAT CE 4009 and KEROSTAT CE 5009. chromium N-oleylanthranilate salts, calcium salts of a Medialan acid and di-tert-butylphenol; POLYFLO 130, TOLAD 511 (a-olefin-acrylonitrile copolymer and polymeric polyamine), EDENOL D32, aluminum stearate, sorbitan-monooleate, glycerol monostearate, methyl toluate, dimethyl maleate, dimethyl furnarate, triethylamine, 3,3-diphenyl-3-(imidazol-1-yl)-propin, and like compounds. In some embodiments, the additional continuity additive is a metal carboxylate salt as described, optionally, with other compounds as described in this section.

Any of the aforementioned additional continuity additives may be employed either alone or in combination as an additional continuity additive. For example, the extracted metal carboxylate salt may be combined with an amine containing control agent (e.g., an extracted carboxylate metal salt with any family member belonging to the KEMAMINE (available from Chemtura Corporation) or ATMER (available from ICI Americas Inc.) family of products). For example, the extracted metal carboxylate salt may be combined with anti-static agents such as fatty amines, such as, KEMAMINE AS 990/2 zinc additive, a blend of ethoxylated stearyl amine and zinc stearate, or KEMAMINE AS 990/3, a blend of ethoxylated stearyl amine, zinc stearate and octadecyl-3,5-di-tert-butyl-4-hydroxyhydrocinnamate.

Other additional continuity additives useful in embodiments disclosed herein are well known to those in the art. Regardless of which additional continuity additives are used, care should be exercised in selecting an appropriate additional continuity additive to avoid introduction of poisons into the reactor. In addition, in selected embodiments, the smallest amount of the additional continuity additives necessary to bring the static charge into alignment with the desired range should be used.

The additional continuity additives may be added to the reactor as a combination of two or more of the above listed additional continuity additives, or a combination of an additional continuity additive and the extracted carboxylate metal salt. The additional continuity additive(s) may be added to the reactor in the form of a solution or a slurry, such as a slurry with a mineral oil, and may be added to the reactor as an individual feed stream or may be combined with other feeds prior to addition to the reactor. For example, the additional continuity additive may be combined with the catalyst or catalyst slurry prior to feeding the combined catalyst-static control agent mixture to the reactor.

In some embodiments, the additional continuity additives may be added to the reactor in an amount ranging from about 0.05 to about 200 ppmw, or from about 2 to about 100 ppmw, or from about 2 to about 50 ppmw, based on the polymer production rate. In some embodiments, the additional continuity additives may be added to the reactor in an amount of about 2 ppmw or greater, based on the polymer production rate.

Catalyst Composition

The method for making the catalyst composition generally involves contacting the catalyst compound with the metal carboxylate salt which is essentially free of carboxylic acids. It is understood that contacting may also refer to combining, blending, mixing, or the like.

In an embodiment, the metal carboxylate salt is present in the catalyst composition at from about 0.1 to about 20 wt %. Within this range, the metal carboxylate salt is present in the catalyst composition preferably at greater than or equal to about 0.5%, or 1%, or 2%, or 3%, or 4%, or 5%, or 6%, or 7%, or 8%, or 9%, or 10%, based on the total weight of the catalyst composition. Also within this range, the metal carboxylate salt is present in the catalyst composition preferably at less than or equal to about 25%, or 20%, or 15%, or 10%, based on the total weight of the catalyst composition. The metal carboxylate salt may be present in the catalyst composition in an amount in the range that comprises any upper and any lower boundary disclosed above.

In one embodiment, a metallocene catalyst, optionally with other catalyst, is combined, contacted, blended, and/or mixed with the metal carboxylate salt. The catalyst may be supported. In another embodiment, the steps of the method include forming a catalyst, such as forming a supported catalyst, and contacting the catalyst with the metal carboxylate salt. In an illustrative embodiment, the catalyst composition may comprise a catalyst, an activator or cocatalyst, and a support.

One skilled in the art recognizes that depending on the catalyst system and the metal carboxylate salt and/or other additive compounds used, certain conditions of temperature and pressure would be required to prevent, for example, a loss in the activity of the catalyst system.

In one embodiment, a continuity additive is introduced directly into the reactor independently of the inventive catalyst composition. In an embodiment, the continuity additive comprises the instant metal carboxylate salt which is essentially free of carboxylic acids.

In alternative embodiment, introduction of the continuity additive directly into the reactor in the presence of a supported catalyst system may vary depending on one or more of the conditions, temperature and pressure, the type of mixing apparatus, the quantities of the components to be combined, and even the mechanism for introducing the catalyst/continuity additive combination into the reactor.

In a class of embodiments, the ratios of amount of continuity additive to the amount of polymer produced in the reactor at any time may be between 0.5 ppm and 1000 ppm, and between 1 ppm and 400 ppm in another embodiment, and between 5 ppm and 50 ppm in yet another embodiment.

Techniques and equipment contemplated for use in the method of the invention are understood. Mixing or contacting techniques may involve any mechanical mixing means, for example shaking, stirring, tumbling, and rolling. Another technique contemplated involves the use of fluidization, for example, in a fluid bed reactor vessel where circulated gases provide the contacting.

In one embodiment, a supported metallocene catalyst is tumbled with a metal carboxylate salt for a period of time such that a substantial portion of the supported catalyst is mixed and/or substantially contacted with the metal carboxylate salt. The metal carboxylate salt may also be pre-mixed with a cocatalyst or activator such as, an organo metallic compound, such as, MAO or MMAO, before being introduced into the reactor.

In another embodiment, the catalyst system is supported, preferably the supported catalyst system is substantially dried, preformed, and/or free flowing. In an embodiment, the preformed supported catalyst system is contacted with the metal carboxylate salt. The metal carboxylate salt may be in solution, emulsion, or slurry. It may also be in a solid form such as free flowing powder. In another embodiment, the metal carboxylate salt is contacted with a supported catalyst system, for example, a supported metallocene catalyst system, in a rotary mixer under a nitrogen atmosphere, most preferably the mixer is a tumble mixer, or in a fluidized bed mixing process.

In another illustrative embodiment, a metallocene catalyst is contacted with a support to form a supported catalyst compound. In this embodiment, an activator for the catalyst compound is contacted with a separate support to form a supported activator. It is contemplated in this particular embodiment that a metal carboxylate salt is then mixed with the supported catalyst compound or the supported activator, in any order, separately mixed, simultaneously mixed, or mixed with only one of the supported catalyst, or preferably the supported activator prior to mixing the separately supported catalyst and activator.

In a class of embodiments, the mole ratio of the metal of the activator component to the metal of the metallocene catalyst compound is in the range of between 0.3:1 to 10,000:1, preferably 100:1 to 5000:1, and most preferably 50:1 to 200:1.

In an embodiment, a method of co-injecting an unsupported catalyst and a continuity additive into the reactor is also provided. In one embodiment the catalyst is unsupported, for example, in a liquid form such as described in U.S. Pat. Nos. 5,317,036 and 5,693,727 and European publication EP-A-0 593 083. The catalyst in liquid form may be fed with a continuity additive to a reactor using the injection methods described, for example, in WO 97/46599.

In an embodiment, 20 g of the catalyst composition flows through a funnel in less than 45 seconds at a temperature of about 25° C. to about 50° C., wherein the funnel is a glass funnel having a conical mouth with an opening angle of 60 degrees, a hole of 7 mm diameter at the bottom of the funnel, and the funnel does not have a stem. In another embodiment, 20 g of the catalyst composition flows through a funnel in less than 10 seconds at a temperature of about 25° C. to about 50° C., wherein the funnel is a glass funnel having a conical mouth with an opening angle of 60 degrees, a hole of 10 mm diameter at the bottom of the funnel, and the funnel does not have a stem. In yet another embodiment, 20 g of the catalyst composition flows through a funnel in less than 5 seconds at a temperature of about 25° C. to about 50° C., wherein the funnel is a glass funnel having a conical mouth with an opening angle of 60 degrees, a hole of 12 mm diameter at the bottom of the funnel, and the funnel does not have a stem.

Polymerization Processes

Polymerization processes may include solution, gas phase, slurry phase and a high pressure process or a combination thereof. In illustrative embodiments, a gas phase or slurry phase polymerization of one or more olefins at least one of which is ethylene or propylene is provided.

The catalysts and catalyst systems of the invention described above are suitable for use in any prepolymerization and/or polymerization process over a wide range of temperatures and pressures. The temperatures may be in the range of from −60° C. to about 280° C., preferably from 50° C. to about 200° C.; and from 60° C. to 120° C. in yet a more particular embodiment, and from 70° C. to 100° C. in yet another embodiment, and from 80° C. to 95° C. in yet another embodiment.

In one embodiment, the process of this invention is directed toward a solution, high pressure, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefins or comonomers such as ethylene, propylene, 1-butene, 1-pentene, 4-methyl-1-pentene, 1-hexene, 1-octene 1-decene or the like.

Other olefins useful in the process of the invention include ethylenically unsaturated monomers, diolefins having 4 to 18 carbon atoms, conjugated or nonconjugated dienes, polyenes, vinyl monomers and cyclic olefins. Monomers useful in the invention may include, but are not limited to, norbornene, norbornadiene, isobutylene, isoprene, vinylbenzocyclobutane, styrenes, alkyl substituted styrene, ethylidene norbornene, dicyclopentadiene and cyclopentene. In an illustrative embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process. In another embodiment of the process of the invention, ethylene or propylene is polymerized with at least two different comonomers, optionally one of which may be a diene, to form a terpolymer.

In one embodiment, the invention is directed to a polymerization process, particularly a gas phase or slurry phase process, for polymerizing propylene alone or with one or more other monomers including ethylene, and/or other olefins having from 4 to 12 carbon atoms. The polymerization process may comprise contacting ethylene and optionally an alpha-olefin with the catalyst composition in a reactor under polymerization conditions to produce the ethylene polymer or copolymer.

Suitable gas phase polymerization processes are described in, for example, U.S. Pat. Nos. 4,543,399, 4,588,790, 5,028,670, 5,317,036, 5,352,749, 5,405,922, 5,436,304, 5,453,471, 5,462,999, 5,616,661, 5,668,228, 5,627,242, 5,665,818, and 5,677,375, and European publications EP-A-0 794 200, EP-A-0 802 202, EP-A2 0 891 990, and EP-B-634 421.

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

A polymerization technique of the invention is referred to as a particle form polymerization, or a slurry process where the temperature is kept below the temperature at which the polymer goes into solution. Such technique is well known in the art, and described in for instance U.S. Pat. No. 3,248,179. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484. Examples of solution processes are described in U.S. Pat. Nos. 4,271,060, 5,001,205, 5,236,998 and 5,589,555.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description of how to make and use the compounds of the invention, and are not intended to limit the scope of that which the inventors regard as their invention.

Comparative Metal Carboxylate Salt

The comparative metal carboxylate salt was a sample of commercially available Aluminum Distearate 22 (Identified herein as AlSt2, Chemtura Corporation, Memphis, Tenn.). AlSt2 had an ash content of 11~12 wt %, a moisture content of ~0.5 wt %, and a free fatty acid content of 3~4 wt %.

Inventive Metal Carboxylate Salt

The inventive metal carboxylate salt was prepared via extraction with various solvents as indicated in Table 1. In the extraction, a known amount of the aluminum distearate was extracted with the indicated solvent by combining the AlSt2 with the indicated solvent with agitation. The solvent was then removed and the extracted aluminum distearate (AlSt2-E) was dried, sieved, and once again weighed to determine the amount of material removed via the extraction.

The dielectric constant of the solvents used are well known and can be found, for example, in the CRC Handbook of Chemistry and Physics 59$^{th}$ Edition on pages E-55 to E-62. Methanol has a dielectric constant at 25° C. of 32.63. Ethanol has a dielectric constant at 25° C. of 24.30. Isopropanol (2-Propanol) has a dielectric constant at 25° C. of 20.1.

TABLE 1

Alcohol Extraction of Aluminum Stearate

| Sample | Start weight | Solvent | Temp. | Weight of Solubles collected | % solubles removed |
|---|---|---|---|---|---|
| Comparative Example 1 | N/A | N/A | N/A | N/A | N/A |
| Example 2 | 25 g | MeOH 150 ml | 22° C. | 1.5 g | 6.0% |
| Example 3 | 10 g | EtOH 100 ml | 22° C. | 0.35 g | 3.5% |
| Example 4 | 10 g | i-PrOH 100 ml | 22° C. | 0.33 g | 3.3% |
| Example 5 | 10 g | MeOH 100 ml | 45° C. | 0.56 g | 5.6% |

Catalyst Compositions

To produce the catalyst compositions, the indicated aluminum distearate (e.g., extracted AlSt2-E or comparative AlSt2) was combined with a supported metallocene catalyst compound as described in Table 2 to produce a catalyst composition. The catalyst composition was charged into a serum bottle under anaerobic conditions and along with an amount of the carboxylate metal salt. The mixture was dry blended for the time indicated under low tumbling speed.

Catalyst A signifies bis-(1-methyl,3-n-butylcyclopentadienyl) zirconium di-chloride and MAO supported on dehydrated silica as a free flowing solid. Catalyst B contains MAO and dimethylsilyl-bis-tetrahydroindenylziconium dichloride on dehydrated silica.

Flowability Tests

A funnel test was used for measuring flow properties of the catalyst compositions. The following procedure outlines the steps followed to measure catalyst flowability. Because the catalyst samples are air and moisture sensitive, the test was performed under anaerobic conditions. A glass funnel having a conical mouth with an opening angle of 60 degrees and a hole at the bottom was utilized for the testing. The testing funnels did not have a stem protruding from the hole at the bottom. The opening sizes of the funnel were 12, 10 and 7 mm.

The steps were as follows: 1) Twenty grams of the catalyst sample was placed into a funnel whereby the bottom of the funnel was sealed. 2) To start the measurement, the bottom seal of the funnel was removed and the time for the entire catalyst to flow through the funnel was measured using a stopwatch. 3) The stopwatch time was recorded and the procedure repeated using a funnel having a smaller hole at the bottom with the exception that catalyst samples that did not flow through a certain size funnel were not tested using smaller size funnels.

The results of the flowability tests are presented in Table 2. The inventive blended catalyst generally exhibited better flow characteristics than the corresponding comparative blended catalysts.

TABLE 2

Flowability Tests

| Sample | Aluminum Stearate | Catalyst | Wt % Aluminum Stearate added | Blend Time | 5 mm opening Flow Time (sec) | 7 mm opening Flow Time (sec) | 10 mm opening Flow Time (sec) | 12 mm opening Flow Time (sec) |
|---|---|---|---|---|---|---|---|---|
| Comparative Example 6 | Comparative Example 1 | Cat. A | 4 | 5 min | No flow | No flow | No flow | No flow |
| Example 7 | Example 2 | Cat. A | 4 | 5 min | 137 | 30 | 11 | 4 |
| Example 8 | Example 4 | Cat. A | 4 | 5 min | 139 | 30 | 10 | 4 |
| Example 9 | Example 5 | Cat. A | 4 | 5 min | 108 | 34 | 9 | 5 |
| Comparative Example 10 | Comparative Example 1 | Cat. B | 4 | 5 min | No flow | No flow | No flow | 4 |
| Example 11 | Example 2 | Cat. B | 4 | 5 min | No flow | 60 | 12 | 3 |

In addition, GC/MS data was obtained to further characterize the extracted portion of the aluminum stearate from Example 2. The following results in Table 3 were obtained. In Table 3, the area percents were normalized to 100% after eliminating the methanol solvent peak.

TABLE 3

Gas Chromatography/Mass Spectrometer Characterization of Extracted Portion of Example 2

| Peak No. | FID RT | Peak Area | Area % | Component | M.F. | Class |
|---|---|---|---|---|---|---|
| 1 | 30.888 | 6134690 | 0.110 | Tetradecanoic acid, methyl ester | $C_{15}H_{30}O_2$ | ox15 |
| 2 | 31.185 | 6361735 | 0.1151 | Tetradecanoic acid | $C_{14}H_{28}O_2$ | ox14 |
| 3 | 31.611 | 402818 | 0.0073 | Methyl ester of C15 carboxylic acid | $C_{16}H_{32}O_2$ | ox16 |
| 4 | 31.723 | 1105204 | 0.0200 | Methyl ester of C15 carboxylic acid | $C_{16}H_{32}O_2$ | ox16 |
| 5 | 32.004 | 272531 | 0.0049 | Methyl ester of C15 carboxylic acid | $C_{16}H_{32}O_2$ | ox16 |
| 6 | 33.058 | 6499158 | 0.1176 | Hexadecanoic acid, methyl ester | $C_{17}H_{34}O_2$ | ox17 |
| 7 | 33.353 | 25746889 | 0.4660 | Hexadecanoic acid | $C_{16}H_{32}O_2$ | ox16 |
| 8 | 33.822 | 1126253 | 0.0204 | C16+ carboxylic acid ester | ? | ? |
| 9 | 35.023 | 3877484 | 0.0702 | Octadecanoic acid, methyl ester | $C_{19}H_{38}O_2$ | ox19 |
| 10 | 35.304 | 3725289 | 0.0674 | Octadecanoic acid. | $C_{18}H_{36}O_2$ | ox18 |

Various examples were also conducted to vary the amount of aluminum stearate blended into the catalyst composition. As seen in Table 4, a 3 wt % loading did not result in much change between the comparative and the inventive catalyst composition flow properties. However, at 5 wt % loading of the aluminum stearate, a vast improvement in flow properties is achieved using the inventive AlSt2-E.

TABLE 4

Varied Amounts of Aluminum Stearate

| Sample | Aluminum Stearate | Catalyst | Wt % Aluminum Stearate | Blend Time | 5 mm opening Flow Time (sec) | 7 mm opening Flow Time (sec) | 10 mm opening Flow Time (sec) | 12 mm opening Flow Time (sec) |
|---|---|---|---|---|---|---|---|---|
| Comparative Example 11 | Comparative Example 1 | Cat. A | 3% | 3 min | 95 | 31 | 7 | 3 |
| Example 12 | Example 2 | Cat. A | 3% | 3 min | 103 | 32 | 10 | 3 |
| Comparative Example 13 | Comparative Example 1 | Cat. A | 5% | 3 min | No flow | No flow | No flow | No flow |
| Example 14 | Example 2 | Cat. A | 5% | 3 min | 131 | 38 | 9 | 4 |

In other examples, AlSt2 was extracted with MeOH and acetone. The AlSt2-E was then combined with the catalyst compound (Cat. A) and the flow testing conducted. The results are as follows in Table 5.

TABLE 5

| Sample | Aluminum distearate | Wt % aluminum stearate | Blend Time # of turns in mixer | 5 mm opening Flow Time (sec) | 7 mm opening Flow Time (sec) | 10 mm opening Flow Time (sec) | 12 mm opening Flow Time (sec) |
|---|---|---|---|---|---|---|---|
| Comparative Example 15 | Comparative Example 1 | 3 | 8 | 100 | 32 | 9 | 4 |
| Comparative Example 16 | Comparative Example 1 | 6 | 8 | 132 | 45 | 13 | 5 |
| Comparative Example 17 | Comparative Example 1 | 6 | 18 | No flow | No flow | No flow | No flow |
| Example 18 | MeOH Extracted* | 3 | 8 | 112 | 33 | 9 | 4 |
| Example 19 | MeOH Extracted* | 6 | 8 | 123 | 41 | 9 | 4 |
| Example 20 | MeOH Extracted* | 6 | 18 | No flow | 67 | 16 | 5 |

TABLE 5-continued

| Sample | Aluminum distearate | Wt % aluminum stearate | Blend Time # of turns in mixer | 5 mm opening Flow Time (sec) | 7 mm opening Flow Time (sec) | 10 mm opening Flow Time (sec) | 12 mm opening Flow Time (sec) |
|---|---|---|---|---|---|---|---|
| Example 21 | Acetone Extracted** | 3 | 8 | 131 | 32 | 9 | 4 |
| Example 22 | Acetone Extracted** | 6 | 8 | 108 | 34 | 11 | 5 |
| Example 23 | Acetone Extracted** | 6 | 18 | 106 | 36 | 10 | 4 |

*Methanol Extracted 5~6 wt % extracted from AlSt2
**Acetone Extracted 4~5 wt % extracted from AlSt2

The effect of the extraction of the AlSt2 on catalyst activity was also evaluated utilizing a laboratory polymerization reactor. The results are as follows in Table 6.

TABLE 6

| | Carboxylic acid removed | Wt % of aluminum stearate added | Catalyst Activity gPE/gCat * hr |
|---|---|---|---|
| Comparative AlSt2 | 0 | 6 | 3280 |
| Comparative Stearic acid | n/a | 6 | 2598 |
| Comparative hexane extracted AlSt2-E | <1 wt % | 6 | 3210 |
| Comparative heptane extracted AlSt2-E | <1 wt % | 6 | 3117 |
| Inventive Acetone extracted AlSt2-E | 3.2 wt % | 6 | 3220 |
| Inventive ether extracted AlSt2-E | 3.4 wt % | 6 | 2914 |
| Inventive MeOH extracted AlSt2-E | 6.0 wt % | 6 | 3014 |

DSC Measurements

The DSC measurements shown in FIG. 1-4 were made on a Perkin Elmer System 7 Thermal Analysis System according to ASTM D 3418. For example, the data reported are $T_{max}$ from first melting data ($T_{max}$ first melt) and $T_{max}$ from second melting data ($T_{max}$ second melt), respectively. To obtain the $T_{max}$ first melt, a sample of reactor granules is heated at a programmed rate of 10° C./min to a temperature above its melting range. Specifically, the samples were 1) held for 10 min at −20° C., 2) heated from −20° C. to 200° C. at 10° C./min 3) held for 10 min at 200° C. To obtain the $T_{max}$ second melt, the sample is heated at a programmed rate of 10° C./min to a temperature above its melting range as described above, cooled at a programmed rate of 10° C./min to a temperature below its crystallization range (−20° C.), held at this low temperature for 10 min and reheated to 200° C. at a programmed rate of 10° C./min.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited.

All documents cited are herein fully incorporated by reference for all jurisdictions in which such incorporation is permitted and to the extent such disclosure is consistent with the description of the present invention.

What is claimed is:

1. A catalyst composition comprising:
   a. a catalyst compound; and
   b. a metal carboxylate salt, wherein the metal carboxylate salt is essentially free of carboxylic acids as determined by differential scanning calorimetry such that the metal carboxylate salt does not exhibit any melting peaks that are less than or equal to 75° C.

2. The catalyst composition of claim 1, wherein the carboxylic acids are represented by the formula RCOOH, and wherein R is a hydrocarbyl radical having from 6 to 30 carbon atoms.

3. The catalyst composition of claim 1, wherein the metal carboxylate salt is represented by the formula:

MQ$x$(OOCR)$y$ where M is a Group 13 metal from the Periodic Table of Elements;
Q is a halogen, hydroxy, alkyl, alkoxy, aryloxy, siloxy, silane or sulfonate group; R is a hydrocarbyl radical having from 12 to 30 carbon atoms;
x is an integer from 0 to 3;
y is an integer from 1 to 4; and
the sum of x and y is equal to the valence of the metal M.

4. The catalyst composition of claim 1, wherein the metal carboxylate salt comprises an aluminum carboxylate.

5. The catalyst composition of claim 1, wherein the metal carboxylate salt comprises an aluminum mono-stearate, an aluminum di-stearate, an aluminum tri-stearate, or a combination thereof.

6. The catalyst composition of claim 1, wherein the catalyst composition further comprises a support and an activator, and wherein the catalyst compound is a metallocene catalyst comprising a titanium, a zirconium, or an hafnium atom.

7. The catalyst composition of claim 1, wherein the catalyst compound is a metallocene catalyst and the metallocene catalyst is selected from the group consisting of:
(Pentamethylcyclopentadienyl) (Propyl cyclopentadienyl) MX$_2$,
Tetramethylcyclopentadienyl) (Propyl cyclopentadienyl) MX$_2$,
(Tetramethylcyclopentadienyl) (Butyl cyclopentadienyl) MX$_2$,
Me$_2$Si(Indenyl)$_2$MX$_2$,
Me$_2$Si(Tetrahydroindenyl)$_2$ MX$_2$,
(n-propyl cyclopentadienyl)$_2$ MX$_2$,
(n-butyl cyclopentadienyl)$_2$ MX$_2$,
(1-Methyl, 3-Butyl cyclopentadienyl)$_2$ MX$_2$,
HN(CH2CH2N(2,4,6-Me3-Phenyl))$_2$ MX$_2$,
HN(CH2CH2N(2,3,4,5,6-Me5-Phenyl))$_2$ MX$_2$,
(Propyl cyclopentadienyl) (Tetramethylcyclopentadienyl) MX$_2$, (Butyl cyclopentadienyl)$_2$ MX$_2$,
(Propyl cyclopentadienyl)$_2$ MX$_2$, and a combination thereof,
wherein M is Zr or Hf, and X is selected from the group consisting of F, Cl, Br, I, Me, Bnz, CH$_2$SiMe$_3$, and C1 to C5 alkyls or alkenyls.

8. The catalyst composition of claim 1, wherein the catalyst composition comprises a support and an activator, and wherein the catalyst compound is a metallocene catalyst selected from the group consisting of (1-Methyl, 3-Butyl cyclopentadienyl)$_2$ ZrX$_2$, and combinations thereof, wherein X is selected from the group consisting of F, Cl, Br, I, and Me.

9. The catalyst composition of claim 1, wherein the metal carboxylate salt is present in the catalyst composition at from about 0.1 weight percent to about 20 weight percent, based to the total weight of the catalyst composition.

10. The catalyst composition of claim 1, wherein 20 g of the catalyst composition flows through a funnel in less than 45 seconds at a temperature of about 25° C. to about 50° C., wherein the funnel is a glass funnel having a conical mouth with an opening angle of 60 degrees, a hole of 7 mm diameter at the bottom of the funnel, and the funnel does not have a stem.

11. The catalyst composition of claim 1, wherein 20 g of the catalyst composition flows through a funnel in less than 10 seconds at a temperature of about 25° C. to about 50° C., wherein the funnel is a glass funnel having a conical mouth with an opening angle of 60 degrees, a hole of 10 mm diameter at the bottom of the funnel, and the funnel does not have a stem.

12. The catalyst composition of claim 1, wherein 20 g of the catalyst composition flows through a funnel in less than 5 seconds at a temperature of about 25° C. to about 50° C., wherein the funnel is a glass funnel having a conical mouth with an opening angle of 60 degrees, a hole of 12 mum diameter at the bottom of the funnel, and the funnel does not have a stem.

13. A process of producing the catalyst composition of claim 1 comprising:
   a. combining the metal carboxylate salt with an organic solvent having a dielectric constant at 25° C. of greater than or equal to 3.0 to extract the free carboxylate acids;
   b. drying the extracted metal carboxylate salt; and
   c. combining the dried extracted metal carboxylate salt with the catalyst.

14. The process of claim 13, wherein the organic solvent is selected from the group consisting of C$_1$-C$_{10}$ alcohols, C$_1$-C$_{10}$ ketones, C$_1$-C$_{10}$ esters, C$_1$-C$_{10}$ ethers, C$_1$-C$_{10}$ alkyl halides, C$_1$-C$_{10}$ alkylonitriles, C$_1$-C$_{10}$ dialkyl sulfoxides, and combinations thereof.

15. The process of claim 13, wherein the organic solvent is selected from the group consisting of methanol, ethanol, propanol, isopropanol, butanol, acetone, methyl-ethyl ketone, methyl acetate, ethyl acetate, methyl propionate, methyl buterate, dimethyl ether, diethyl ether, 1,4-dioxane, tetrahydrofuran, chloroform, dichloromethane, acetonitrile, dimethyl sulfoxide, and combinations thereof.

16. The process of claim 13, wherein the combining of the dried extracted metal carboxylate salt with the catalyst comprises dry blending.

17. A polymerization process for the production of an ethylene polymer or copolymer comprising contacting ethylene and optionally another alpha-olefin with the catalyst composition of claim 1 in a reactor under polymerization conditions to produce the ethylene polymer or copolymer.

18. The polymerization process of claim 17, further comprising adding a continuity additive comprising a metal carboxylate salt into the reactor independently of the catalyst composition, wherein the metal carboxylate salt in the continuity additive is essentially free of free acids.

* * * * *